Nov. 9, 1954 W. A. HEIDMAN, JR 2,693,980
COUPLING UNIT
Filed Sept. 15, 1951 3 Sheets-Sheet 1

Inventor
William A. Heidman, Jr.
By
Attorney

Nov. 9, 1954 W. A. HEIDMAN, JR 2,693,980
COUPLING UNIT
Filed Sept. 15, 1951 3 Sheets-Sheet 2

Inventor
William A. Heidman, Jr.
By-
Attorney

Nov. 9, 1954 W. A. HEIDMAN, JR 2,693,980
COUPLING UNIT
Filed Sept. 15, 1951 3 Sheets-Sheet 3
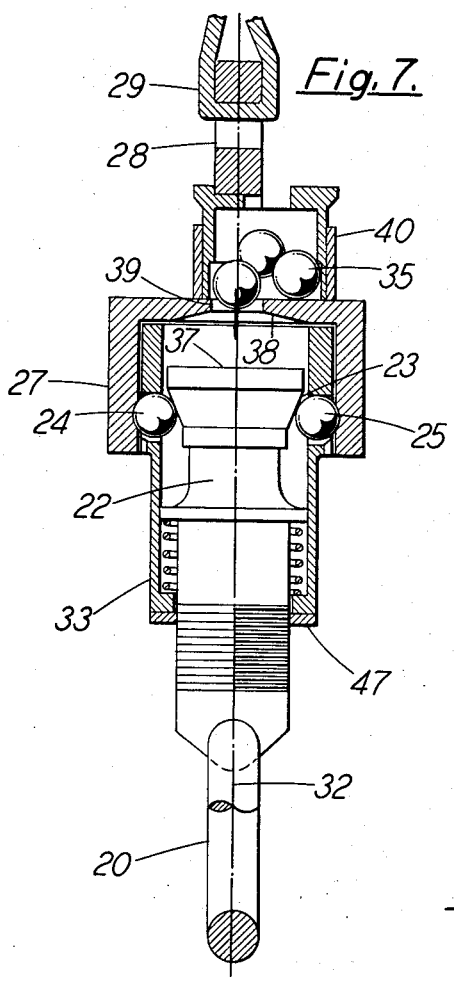
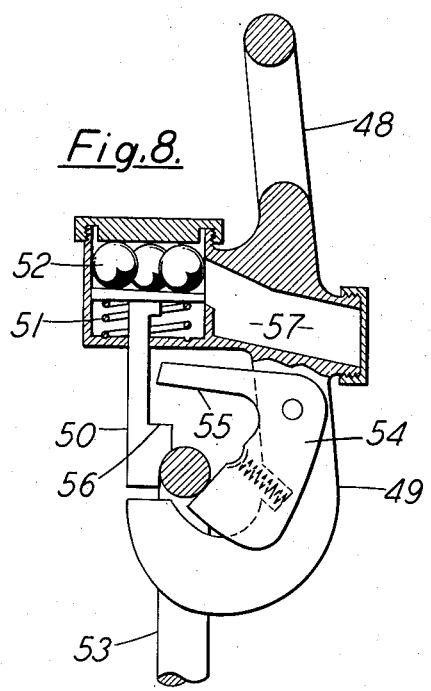
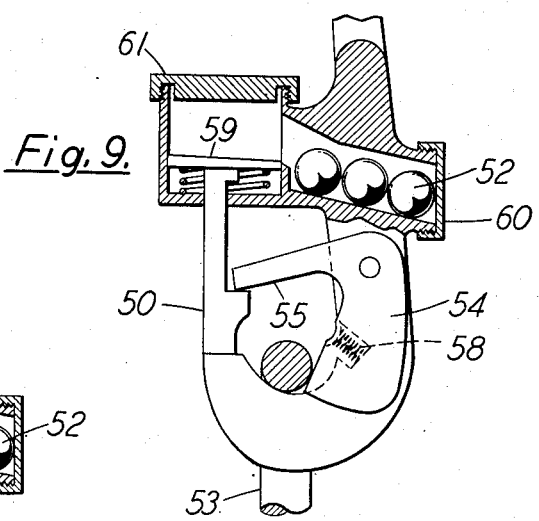
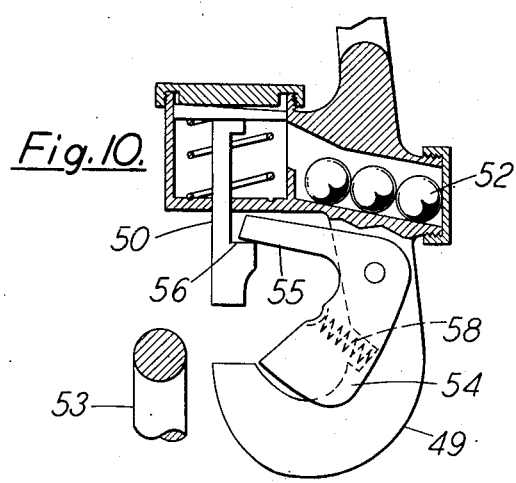
Inventor
William A. Heidman, Jr.
-By-
Attorney

United States Patent Office 2,693,980
Patented Nov. 9, 1954

2,693,980

COUPLING UNIT

William A. Heidman, Jr., Grand Rapids, Mich.

Application September 15, 1951, Serial No. 246,788

10 Claims. (294—83)

The increased use of cargo parachutes by the Armed Forces has created a need for a device that will automatically release the cargo from the parachute upon the completion of the descent. Experience has taught that such a device makes the cargo more immediately available, and avoids entangling it with the shrouds of the parachute or with the fabric of the parachute itself on completion of the descent. The design of such devices has been made difficult by the conditions encountered during opening and descent. At the moment the cargo is released from the airplane, it is travelling in the direction of the airplane at a considerable velocity. The horizontal speed of the cargo will decrease from that of the airplane from the time of release, due to the effect of air resistance; but the usual period of free fall before the opening of the parachute is of short enough duration that the flying speed of the airplane may be considered as a pair indication of the horizontal velocity of the cargo at the time of opening of the principal parachute. In most cases, the opening of the cargo parachute is a rather violent event, and exerts a tremendous pull upon the cargo as the inertia of the horizontal movement is opposed by the airload on the opening parachute. The attitude of the parachute axis and the cargo at this moment will be a considerable slant to the vertical, due to the combination of inertia and gravity forces. This slant, and the sudden dissipation of load on the parachute after the inertia of the cargo has been overcome, results in initiating a somewhat modified pendulum action shortly after the moment of first shock has passed. As the load on the slanted parachute decreases due to the absence of the inertia forces, the force of gravity on the cargo then begins to predominate, resulting in a more direct downward pull. The center of gravity of the cargo will tend to assume a position under the center of the parachute. The cargo will therefore tend to swing from its slanted position, resulting in the initiation of the pendulum action above referred to. During most of this period of reorientation of the cargo and parachute, the loading of the shrouds of the parachute will result in stretching these members to some extent as if they were springs. After the inertia forces have been dissipated, and the cargo has been slowed down to uniform velocity by the parachute, the continued presence of overload in these extended shrouds will have an effect on the cargo as if it had been suspended on a spring that had been stretched to a force greater than the static weight of the cargo. This condition will result in snapping the cargo in the direction of the parachute with a measurable velocity, and the inertia of this movement will create a temporary slackness in the shrouds sufficient to cause a considerable period of zero loading on whatever fastenings are securing the cargo to the parachute.

Coupling units that have been devised for attaching cargo to parachute are based primarily upon a mechanism that while uncouple upon encountering a moment of zero load. In order to avoid prematurely disengaging the cargo due to the moment of no load that occurs shortly after the opening of the parachute as outlined above, it has been conventional to provide some sort of a time-delay mechanism operating to "arm" the no-load release at a sufficiently later time after the opening impact to assure that disengagement will not take place until the descent has been completed. Another type of device that has been developed involves an impact-actuated locking mechanism having relatively-movable components held apart by spring action, and in which a weight built into one of these components will overcome the action of the spring as soon as the cargo comes to an abrupt stop as it collides with the ground. The varying types of terrain as well as varying types of cargo have resulted in rendering it very difficult to properly adjust an impact release mechanism so that it will satisfactorily function with the wide variety of conditions that are encountered in the field.

The present invention provides a coupling unit that may be said to be "condition responsive" rather than one which is responsive to either time or impact. With this arrangement, no more or less time is used than is actually required for arming the no-load release. This type of device makes possible the discharge of cargo at relatively lower altitudes than is the case with time-delay devices, due to the absence of any unnecessary time that must be allowed with those devices for adequate safety. Independence of the condition-responsive device from the relatively unpredictable effects of inertia on landing creates a much greater reliability and freedom from the necessity of continuing modification and readjustment.

The feature common to the various modifications of the present invention is a locking mechanism involving relatively movable members, the position of which determines the position of a locking component. Preferably, these relatively movable members are biased together, and are held separated (the separated condition corresponding to locking position) by removable objects. These objects are preferably steel balls, and the application of exterior forces resulting in a tendency for the two relatively movable members to separate will result in releasing the balls and permitting the movable members to come together when the pattern of exterior forces changes, and thereby affect release.

One modification of the present invention which makes use of this general principle is adapted for a direct axial coupling. This device includes a conventional ball-type coupler in which locking balls are retained between axially and radially spaced abutments, each of these abutments being fixed to one member of the coupler. Acting with this portion of the mechanism is a novel mechanism for positioning the locking balls. These balls are held in locking position as a function of the relative axial position of the members transmitting the tension through the balls. The axial position corresponding to a locking position of the balls is maintained by a second set of balls acting against spring action which opposes the applied tension. The application of tension to the assembled coupling unit releases the second set of balls and permits the device to uncouple at the next moment of zero load. Escape of this second set of balls takes place through an aperture in a chamber, and this construction gives some rather unexpected and highly desirable results. Preferably, a series of five balls is used in this chamber, and it will be readily recognized that the probability is very much against any of the balls escaping as long as the chamber is in agitated motion. This situation corresponds to the period surrounding the opening of the parachute as the shocks resulting from the opening forces cause a rather violent and agitated movement of the entire assembly.

The escape aperture in the ball chamber is preferably oriented in such a fashion that the balls may roll out smoothly (when spring load is removed from them) when the axis of the coupler is in a substantially vertical position. If the axis of the coupling unit is at an angle to the net forces acting on the balls, certain of the balls will have to move "uphill" against these forces in order to be discharged through the aperture. As long as this situation exists, at least some of the balls will remain in position and maintain the locking condition. This characteristic has reference to the above discussion of the pendulum type of action taking place shortly following the opening of the cargo parachute. The position of the coupling unit at a substantial distance toward the parachute from the center of gravity of the cargo results in a considerably different pattern of forces acting on the balls from those acting upon the cargo itself. A mathematical analysis of the forces acting on a pendulum establishes that they vary considerably with the length of the swing radius. In summary, when a series of bodies are suspended in series, and the assembly permitted to swing, the forces acting on each of the bodies will vary according to the distance from the point from which swinging takes place. The difference in the swinging radius between the coupling device and the center of gravity of the cargo results in causing the coupling axis to be maintained at an angle to the net forces operating upon the balls during most of the period during which the pendulum action is occurring. As a result of this situation, the balls will tend to remain in the chamber during this swinging period, and will not flow smoothly through the aperture until a substantially static condition of descent takes place.

A retainer is preferably used in conjunction with this modification of the invention, and the balls pass into this member after going through the aperture. The container is so proportioned that the balls assume a position in the retainer such that the probability of their escaping back through the aperture on the disengagement of the coupling unit is exceedingly small. An arrangement is also provided in the preferred form of the invention for moving the retaining chamber from its normal position so as to permit the balls to naturally pass back through the escape aperture during the process of loading the balls during the coupling procedure.

A second modification of the present invention incorporates the escaping-ball locking mechanism previously mentioned into a hook-type coupling unit. In this case, the escaping balls position a locking bar against spring action tending to move the locking bar to a position opening the hook and permitting the release of an engaged member. A member acting in response to the presence of such an engaged member under load takes the load off the balls and permits their escape as soon as substantial forces are applied by the engaged member. This load-responsive member is also preferably adapted to urge the discharge of the engaged member on the occurrence of a no-load condition after the escape of the balls.

The several features of the present invention will be analyzed in detail through a discussion of the particular embodiments illustrated in the accompanying drawings. In these drawings:

Figure 7 is a view of the mechanism shown in Figure 1, with the assembly inverted and showing the position of the parts during the coupling operation in which the positioning balls are re-inserted.

Figure 8 is a view of a modified form of the present invention embodied in a hook-type unit, and showing the device before the application of load.

Figure 9 shows the device illustrated in Figure 8 under the application of load.

Figure 10 illustrates the action of the mechanism shown in Figure 8 on the release of the load after the escape of the balls.

Figure 1:
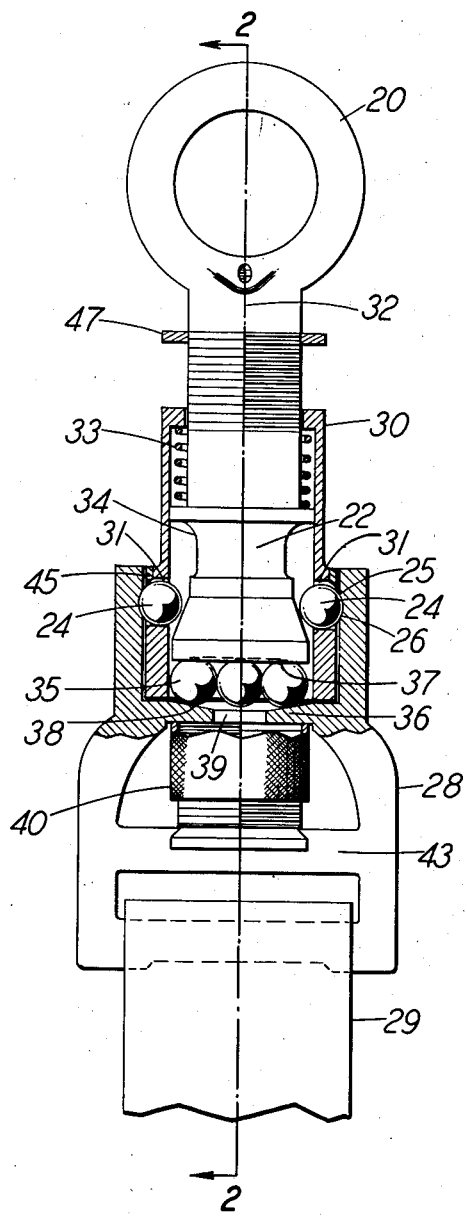
Figure 1 is a section through an axial coupling embodying the present invention and showing the relationship of the parts prior to the opening of the parachute, or prior to the application of first static load.
Figure 2:
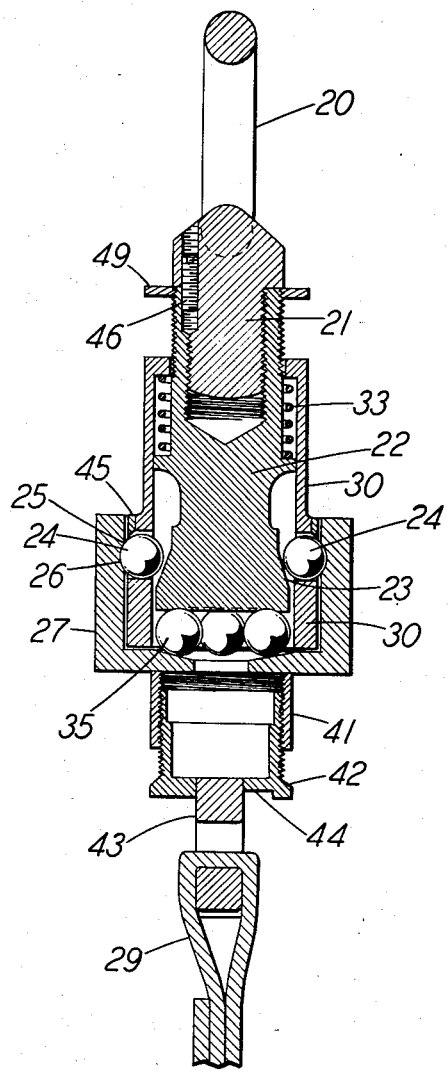
Figure 2 is a section taken on the plane 2—2 of Figure 1.

Referring to Figure 1, a ring 20 is provided as a point for securing the shrouds of the parachute. The cargo load is transmitted from the ring 20 through the integral shank 21 to the internal threads of the head member 22, and from the conical surface 23 of this member through the locking balls 24 to the abutment 25 formed by the recess 26 in the socket member 27. An extension 28 is formed integrally with the socket 27 to provide for the attachment of the strap 29 to which the cargo is secured.

A generally cylindrical positioning member 30 surrounds the head member 22, and is disposed between the head and the socket 27. The cylindrical member 30 is provided with a series of openings 31 disposed in substantially a common plane transverse to the axis 32, and provides a series of generally radial paths within which one of the balls 24 is positioned. The positioning member 30 is biased in a direction away from the conical surface 23 by the action of a spring 33. It will be recognized that downward movement of the conical surface 23 will bring that surface away from the balls 24 and create a considerable space within which these balls can move opposite the reduced diameter 34 of the head member 22. Since the positioning member 30 establishes a general path of movement of the balls 24 in a radial direction with regard to the axis 32, the balls are then free to move inward, and the locking effect between the head 22 and the socket 27 disappears. The action of the spring 23 is strong enough to permit small forces to be applied to the ring 20 sufficient to cause uncoupling without permitting the conical surface 23 to again come into engagement with the balls 24.

A series of preferably five balls 35 is contained within the chamber defined by the inner diameter of the positioning member 30, the transverse portion 36 of the socket member 27, and the lower end 37 of the head member 22. The inside surface 38 of the transverse portion 36 is slanted into a conical surface with respect to the axis 32 to facilitate the movement of the balls toward the aperture 39. The application of tension between the ring 20 and the strap 29 will suffice to expand the distance between the end 37 of the head member 22 and the surface 38 slightly, freeing the balls for movement out through the aperture 39 into the retainer 40.

Preferably, the retainer is formed as a two-piece assembly including the outer member 41 and the inner member 42, which are in threaded engagement. The inner member 42 is provided with a groove at the lower end for engagement with the cross bar 43, this cross bar being a means against which force may be applied through the threaded engagement of parts 41 and 42 to securely force the retainer into engagement with the portion 36 of the socket member 27. A second groove 44 is provided at the lower end of the inner member 42, and this groove is used for eccentrically positioning the retainer during the coupling process so that the balls 35 may move back through the aperture 39.

The assembly and the maintenance of the assembled relationship of the device illustrated is facilitated by the provision of the bevelled ring 45 as a means of holding the balls 24 in assembled relationship with the positioning member 30 and the head member 22. After the balls have been assembled, the ring 45 is preferably pressed into engagement and staked in position to prevent the balls 24 from falling radially outward after disengagement of the coupler. The maintenance of the threaded engagement between the shank 21 and the head member 22 is assured by the provision of the screw 46 having threaded engagement between these members along an axis intercepting the principal threads. The presence of the screw 46 will absolutely prevent any relative rotation between the parts 21 and 22.

Figure 3:
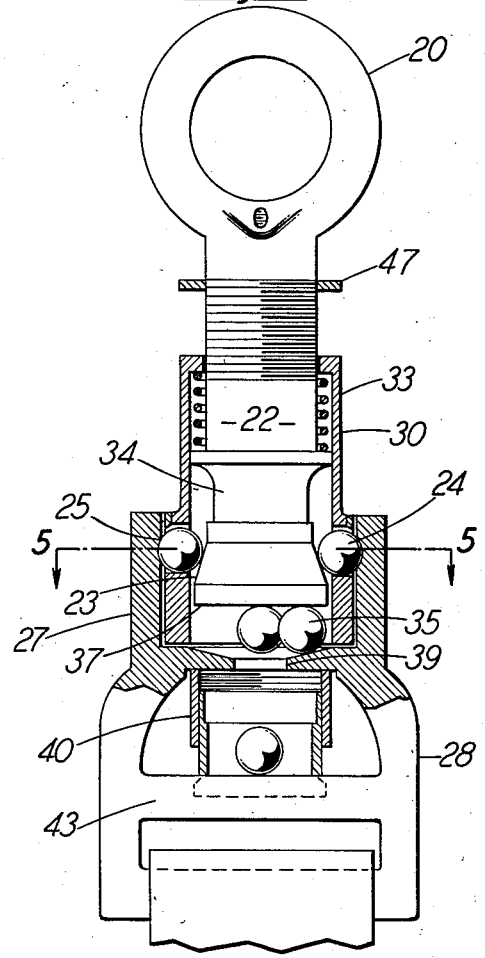
Figure 3 is a section through the same mechanism as indicated in Figure 1, with the parts in position corresponding to the beginning of the release of the balls during the smooth descent of the cargo.

Referring to Figure 3, the balls 24 are shown transmitting load between the conical surface abutment 23 and the abutment 25 formed by the annular recess in the socket member 27. The lower end 37 of the head 22 is shown elevated enough to disengage itself from the balls 35, and permit the same to fall downwardly through the aperture 39 into the retainer 40. One of the balls is shown as having completed its drop into the retainer. The condition shown in Figure 3 corresponds usually to the beginning of uniform descent of the cargo.

Figure 4:
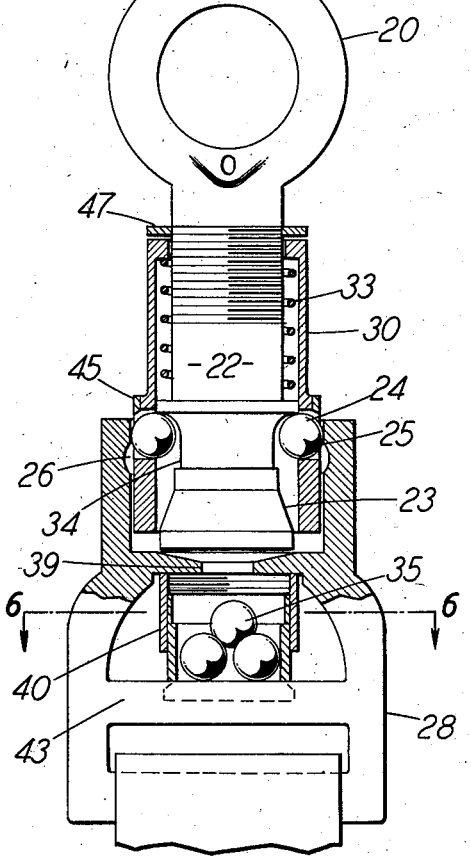
Figure 4 is also a view of the mechanism of Figure 1, with the positioning balls completely discharged and the device beginning to uncouple after the release of load on completion of the descent.
Figure 5:
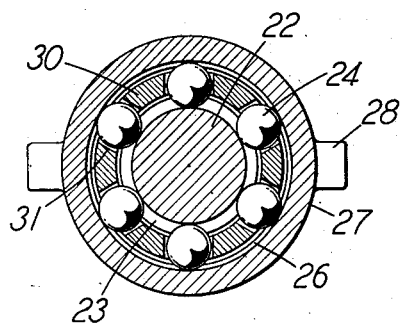
Figure 5 is a section taken on the plane 5—5 of Figure 3.

Referring to Figure 4, the mechanism previously described is shown after the completion of the escape of the balls 35. The absence of the balls 35 will then permit the spring 33 to move the head member 22 downwardly so that the conical surface 23 becomes disengaged from the balls 24 and permits them to move radially inward so as to become disengaged from the abutment 25. An application of load to the ring 20 will then disengage the coupling, the spring 33 maintaining the relative position of the conical surface 23 and the locating member 30.

Figure 6:
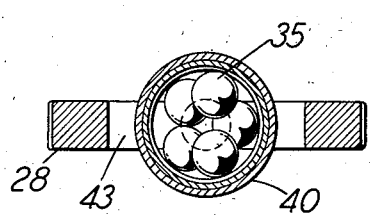
Figure 6 is a section taken on the plane 6—6 of Figure 4.

The form of the container (refer to Figures 4 and 6) is such that the balls 35 after escaping from the aperture 39 assume a position in which the probability against their passing back through the aperture after disengagement of the coupling is very great. The inner diameter of the retainer 40 is greater than twice, but less than three times, that of the balls 35. This relationship, with five balls in the chamber, makes it impossible for any one ball to assume a position on the axis of the chamber where it might easily find its way back through the opening 39 if the device were inverted.

Referring to Figure 7, the device previously described is shown inverted and in the position for re-insertion of the balls 35. The retainer 40 has been moved to a position eccentric to the axis 32 to a point where the locus of natural positions of the balls within the container falls opposite the aperture 39. When the spring 33 is compressed by screwing the threaded ring 47 into the position shown in Figure 7 (after the insertion of the coupling components), the locking engagement will be established between the conical surface 23 and the abutment 25. At this time, sufficient clearance will be present between the end 37 of the head member 22 and the inclined surface 38 to permit entrance of the balls 35 between these surfaces. A slight shaking action will suffice to urge the balls in through the aperture 39 to assume their position within the chamber. The threaded ring 47 may then be screwed back toward the attaching ring 20 to the position shown in Figure 1, and the force of the spring 33 will then be applied to the balls 35 so they will be held in position. Preferably, a slight annular recess is provided in the end 37 of the head member 22 to facilitate holding the balls in position, compensating for the inevitable minute differences in diameter between the balls 35, and allowing for inaccuracies in the formation of the surfaces 37 and 38. The depth of this recess also establishes a certain definite amount of relative displacement required between these surfaces to affect release of the balls 35, and thereby inhibits premature action. After the entry of the balls 35 back into the chamber has been completed, the members 41 and 42 of the retainer 40 may then be unscrewed sufficiently to permit the retainer to be moved back to a position in which its axis falls in alignment with the axis 32 of the entire assembly. The members may then be unscrewed until the retainer assembly bears firmly between the cross bar 43 and the socket member 27.

Referring to Figures 8 through 10, inclusive, a modified form of the present invention is illustrated in which a hook-type engaging member is provided with a locking system embodying the escaping-ball principle. A securing ring 48 is integrally formed with the hook member 49, and a locking bar 50 is mounted for axial movement on the hook member 49 to and from a position in which it closes the opening of the hook. A spring 51 biases the locking member 50 toward an open position, and the balls 52, when in the position shown in Figure 3, prevent such movement. The application of load by an engaged member 53 positioned in the hook 49 will result in counterclockwise rotation of the ejector 54, and engagement of the projection 55 thereon with the surface 56 of the locking bar 50. In this manner, a downward force is applied to the bar 50 sufficient to overcome the spring 51. Slight downward movement of this bar will permit the release of the balls 52 out into the receptacle chamber 57. When load is applied to the engaged member as outlined above, the components assume the position shown in Figure 9.

When the load is released after having been maintained for a short period during which the device has been relatively stable, the components will then assume the position shown in Figure 10. A release of the load will permit the ejector spring 58 to cause the ejector 54 to move clockwise and sweep the hook 49 clear of the engaged member 53. Preferably, the surface 59 at the upper end of the bar 50 is inclined somewhat to the axis established by the application of load between the engaged member 53 and the ring 48. The purpose of such inclination is to facilitate the escape of the balls after the device has assumed a position in which the axis is vertically oriented.

In order to engage this assembly, a member 53 is again placed within the hook 49, and the ejector 54 forceably rotated to approximately the position shown in Figure 9. The projection 55 will then move the bar 50 to a point where the balls 52 may be re-admitted above the surface 59 by tilting the device. Suitable covers 60 and 61 are provided in this structure to facilitate the assembly of the unit.

The particular embodiments that have been shown and described herein are for illustrative purposes only, and are not to be considered as a limitation on the scope of the appended claims. In these claims, it is my invention to claim the entire invention to which I am entitled, except as I am limited by the prior art.

I claim:

1. A coupling, comprising: first and second coupling members receivable one within the other and disengageable on relative movement along a particular axis, said first and second coupling members each having fixed abutment means disposed substantially transversely to said axis; movable abutment means insertable between said fixed abutment means; positioning means insertable between said first and second coupling members and establishing a path of substantially radial movement of said movable abutment means with respect to said axis; biasing means urging relative axial movement between said positioning means and second coupling member in a direction to disengage the same from said movable abutment means; and control means establishing the axial relationship of said positioning means and second coupling member, said control means including a plurality of balls adapted for insertion between opposite surfaces substantially perpendicular to said axis on said first and second coupling members, said first coupling member having an aperture in its surface of said opposite surfaces, said aperture being adapted to pass said balls.

2. A coupling, comprising: first and second coupling members receivable one within the other and disengageable on relative movement along a particular axis, said first coupling member having fixed abutment means disposed substantially transversely to said axis; movable abutment means insertable at one side of said fixed abutment means; positioning means insertable between said first and second coupling members and establishing a path of substantially radial movement of said movable abutment means with respect to said axis; means forming a surface inclined to said axis on said second coupling member disposed to engage said movable abutment means on the opposite side thereof from said fixed abutment means; biasing means urging relative axial movement between said positioning means and second coupling member in a direction to disengage said inclined surface means from said movable abutment means; and control means establishing the axial relationship of said positioning means and second coupling member, said control means including a plurality of balls adapted for insertion between opposite surfaces substantially perpendicular to said axis on said first and second coupling members, said first coupling member having an aperture in its surface of said opposite surfaces, said aperture being adapted to pass said balls.

3. A coupling, comprising: first and second coupling members receivable one within the other and disengageable on relative movement along a particular axis, said first coupling member having fixed abutment means disposed substantially transversely to said axis; movable abutment means insertable at one side of said fixed abutment means; positioning means insertable between said first and second coupling members and establishing a path of substantially radial movement of said movable abutment means with respect to said axis; means forming a surface inclined to said axis on said second coupling member disposed to engage said movable abutment means on the opposite side thereof from said fixed abutment means; biasing means urging relative axial movement between said positioning means and second coupling member in a direction to disengage said inclined surface means from said movable abutment means; control means establishing the axial relationship of said positioning means and second coupling member, said control means including a plurality of balls adapted for insertion between opposite surfaces substantially perpendicular to said axis on said first and second coupling members; said first coupling member having an aperture in its surface of said opposite surfaces, said aperture being adapted to pass said balls; and spring-compressing means including a member having threaded engagement with said second coupling member and adapted to bear against said positioning member in the manner of a screwjack.

4. A coupling, comprising: first and second coupling members receivable one within the other and disengageable on relative movement along a particular axis, said first coupling member having fixed abutment means disposed substantially transversely to said axis; a first series of balls, said first series of balls being insertable at one side of said fixed abutment means; positioning means insertable between said first and second coupling members and establishing a path of substantially radial movement of said first series of balls with respect to said axis; means forming a surface inclined to said axis on said second coupling member disposed to engage said first series of balls on the opposite side thereof from said fixed abutment means; biasing means urging relative axial movement between said positioning means and second coupling member in a direction to disengage said inclined surface means from said first series of balls; and control means establishing the axial relationship of said positioning means and second coupling member, said control means including a second series of balls, said second series of balls being adapted for insertion between opposite surfaces substantially perpendicular to said axis on said first and second coupling members, said first coupling member having an aperture in its surface of said opposite surfaces, said aperture being adapted to pass said second series of balls.

5. A coupling, comprising: first and second coupling members receivable one within the other and disengageable on relative movement along a particular axis, said first coupling member having fixed abutment means disposed substantially transversely to said axis; movable abutment means insertable at one side of said fixed abutment means; positioning means insertable between said first and second coupling members and establishing a path of substantially radial movement of said movable abutment means with respect to said axis; means forming a surface inclined to said axis on said second coupling member disposed to engage said movable abutment means on the opposite side thereof from said fixed abutment means; biasing means urging relative axial movement between said positioning means and second coupling member in a direction to disengage said inclined surface means from said movable abutment means; control means establishing the axial relationship of said positioning means and second coupling member, said control means including a plurality of balls adapted for insertion between opposite surfaces substantially perpendicular to said axis on said first and second coupling members, said first coupling member having an aperture in its surface of said opposite surfaces, said aperture being adapted to pass said balls; and retainer means disposed to receive said balls on the opposite side of said aperture from said second coupling member, said retainer being formed to receive said balls in a relationship tending to isolate the same from said aperture on inversion of said coupling.

6. A coupling comprising: a hook member; a bar slideably mounted on said hook member to and from a position closing said hook; means forming opposite abutment surfaces on said hook member and said bar transversely disposed with respect to the direction of movement thereof, said surfaces being disposed on their respective members to cause said bar to open said hook when said surfaces are closely adjacent; movable abutment means insertable between said opposite abutment surfaces with said bar in substantially closed position; first biasing means, said first biasing means urging said bar to a position opening said hook member, said hook member being formed to permit the escape of said movable abutment means on separation of said opposite abutment surfaces; ejecting means movably mounted on said hook member; and second biasing means, said second biasing means urging said ejecting means through a movement tending to sweep said hook member clear of any engaged member, said ejecting means having a projection disposed to move said bar toward closed position on displacement caused by the presence of an engaged member under load.

7. A coupling comprising: a hook member; a bar slidably mounted on said hook member to and from a position closing said hook; means forming opposite abutment surfaces on said hook member and said bar transversely disposed with respect to the direction of movement thereof, said surfaces being disposed on their respective members to cause said bar to open said hook when said surfaces are closely adjacent; at least one ball insertable between said opposite abutment surfaces with said bar in substantially closed position; first biasing means, said first biasing means urging said bar to a position opening said hook member, said hook member being formed to permit the escape of said ball on separation of said opposite abutment surfaces; ejecting means movably mounted on said hook member; and second biasing means, said second biasing means urging said ejecting means through a movement tending to sweep said hook member clear of any engaged member, said ejecting means having a projection disposed to move said bar toward closed position on displacement caused by the presence of an engaged member under load.

8. A coupling comprising: a hook member; a bar slidably mounted on said hook member to and from a position closing said hook; means forming opposite abutment surfaces on said hook member and said bar transversely disposed with respect to the direction of movement thereof, said surfaces being disposed on their respective members to cause said bar to open said hook when said surfaces are closely adjacent; a series of balls insertable between said opposite abutment surfaces with said bar in substantially closed position; first biasing means, said first biasing means urging said bar to a position opening said hook member, said hook member being formed to permit the escape of said series of balls on separation of said opposite abutment surfaces; ejecting means movably mounted on said hook member; and second biasing means, said second biasing means urging said ejecting means through a movement tending to sweep said hook member clear of any engaged member, said ejecting means having a projection disposed to move said bar toward closed position on displacement caused by the presence of an engaged member under load.

9. A coupling, comprising: first and second interengageable coupling members; releasable locking means movable with respect to said coupling members for maintaining the engagement of said coupling members; biasing means urging said locking means to releasing position; abutment means movable with respect to said coupling members and adapted to be interposed between one of said coupling members and said locking means to limit the movement thereof induced by said biasing means, said members being formed to provide space for the escape of said abutment means on release thereof from the forces generated by said biasing means; and means responsive to the application of separating forces applied to said coupling members for moving said locking means against the action of said biasing means.

10. A coupling, comprising: first and second interengageable coupling members; releasable locking means movable with respect to said coupling members for maintaining the engagement of said coupling members; biasing means urging said locking means to releasing position; abutment means movable with respect to said coupling members and adapted to be interposed to limit the movement of said locking means induced by said biasing means, said members being formed to provide space for the escape of said abutment means on release thereof from the forces generated by said biasing means; and means responsive to the application of separating forces applied to said coupling members for moving said locking means against the action of said biasing means.

References Cited in the file of this patent

UNITED STATES PATENTS

| Number | Name | Date |
|---|---|---|
| 2,413,450 | Johnsen (A) | Dec. 31, 1946 |
| 2,420,746 | Heidman | May 20, 1947 |
| 2,435,444 | Johnsen (B) | Feb. 3, 1948 |
| 2,480,662 | McKinzie | Aug. 30, 1949 |
| 2,562,459 | Hoey | July 31, 1951 |